(12) United States Patent
Rasheed et al.

(10) Patent No.: US 7,784,265 B2
(45) Date of Patent: Aug. 31, 2010

(54) MULTIPLE TUBE PULSE DETONATION ENGINE TURBINE APPARATUS AND SYSTEM

(75) Inventors: Adam Rasheed, Glenville, NY (US); Anthony John Dean, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 1242 days.

(21) Appl. No.: 11/349,489

(22) Filed: Feb. 7, 2006

(65) Prior Publication Data

US 2007/0180811 A1 Aug. 9, 2007

(51) Int. Cl.
*F02C 5/00* (2006.01)
(52) U.S. Cl. .................................. 60/39.76; 60/39.45
(58) Field of Classification Search ............. 60/39.76, 60/39.45, 226.1, 247, 776; 123/200
See application file for complete search history.

(56) References Cited

U.S. PATENT DOCUMENTS

| | | | |
|---|---|---|---|
| 5,353,588 A * | 10/1994 | Richard ...................... 60/39.38 |
| 6,349,538 B1 | 2/2002 | Hunter, Jr. et al. ............. 60/204 |
| 6,439,503 B1 | 8/2002 | Winfree et al. ................. 244/53 |
| 6,477,829 B1 | 11/2002 | Hunter et al. .................. 60/225 |
| 6,484,492 B2 | 11/2002 | Meholic et al. ................. 60/247 |
| 6,505,462 B2 | 1/2003 | Meholic ....................... 60/39.39 |
| 6,584,761 B2 | 7/2003 | Hunter, Jr. ..................... 60/204 |
| 6,584,764 B2 | 7/2003 | Baker ............................ 60/247 |
| 6,668,542 B2 | 12/2003 | Baker et al. .................... 60/247 |
| 6,751,943 B2 | 6/2004 | Meholic et al. ................. 60/204 |
| 6,794,781 B2 | 9/2004 | Razzell et al. ............... 310/114 |
| 6,813,878 B2 | 11/2004 | Kraft ............................ 60/247 |
| 6,845,620 B2 | 1/2005 | Nalim .......................... 60/776 |
| 6,889,505 B2 | 5/2005 | Butler et al. ................... 60/776 |
| 6,904,750 B2 | 6/2005 | Venkataramani et al. ... 60/226.1 |
| 6,928,804 B2 | 8/2005 | Venkataramani et al. ... 60/39.34 |
| 6,931,858 B2 | 8/2005 | Venkataramani et al. ...... 60/776 |
| 2002/0088219 A1 | 7/2002 | Meholic et al. ............... 60/204 |
| 2002/0139106 A1 | 10/2002 | Meholic ..................... 60/39.39 |
| 2002/0166318 A1 | 11/2002 | Baker et al. ................... 60/247 |

(Continued)

FOREIGN PATENT DOCUMENTS

EP 1138922 A1 4/2001

OTHER PUBLICATIONS

A. Rashees, A. Furman, & A. Dean, "Experimental investigations of an Axial Turbine Driven by a Multi-tube Pulsed Detonation Combuster System",Jul. 2005, "American Institute of Aeronautics and Astronautics", 13pgs.

*Primary Examiner*—Michael Cuff
*Assistant Examiner*—Vikansha S Dwivedi
(74) *Attorney, Agent, or Firm*—Penny A. Clarke (57) ABSTRACT

A pulse detonation combustor (PDC) assembly includes an upstream chamber forming an inlet plenum, a downstream chamber including a downstream portion of at least one PDC tube, and an integrated PDC head coupled to the upstream chamber and the downstream chamber. The integrated PDC head is configured to facilitate fuel injection and ignition within the PDC tube. The PDC tube includes an inner seal surface and an outer seal surface configured to mate with the inner seal surface, wherein the inner seal surface includes an elevated section thereon that engages with the outer seal surface such that the PDC tube is free to partially pivot about a longitudinal axis thereof.

17 Claims, 6 Drawing Sheets

U.S. PATENT DOCUMENTS

| | | | |
|---|---|---|---|
| 2003/0029161 A1 | 2/2003 | Hunter, Jr. | 60/211 |
| 2003/0029162 A1 | 2/2003 | Baker | 60/247 |
| 2003/0079713 A1 | 5/2003 | Nalim | 123/200 |
| 2003/0136108 A1 | 7/2003 | Meholic et al. | 60/204 |
| 2004/0000145 A1 | 1/2004 | Leyva et al. | 60/772 |
| 2004/0000614 A1 | 1/2004 | Leyva et al. | 244/17.11 |
| 2004/0056766 A1 | 3/2004 | Butz et al. | 340/539.1 |
| 2004/0099764 A1 | 5/2004 | Leyva et al. | 244/24 |
| 2004/0112060 A1 | 6/2004 | Kraft | 60/776 |
| 2004/0172950 A1 | 9/2004 | Venkataramani et al. | 60/776 |
| 2004/0194469 A1 | 10/2004 | Butler et al. | 60/776 |
| 2004/0206089 A1 | 10/2004 | Venkataramani et al. | 60/776 |
| 2004/0237504 A1 | 12/2004 | Pinard et al. | 60/247 |
| 2005/0019620 A1 | 1/2005 | Schick et al. | 429/12 |
| 2005/0028531 A1 | 2/2005 | Venkataramani et al. | 60/776 |
| 2005/0103022 A1 | 5/2005 | Kraft | 60/776 |
| 2005/0109010 A1 | 5/2005 | Dean et al. | 60/39.76 |
| 2005/0120700 A1 | 6/2005 | Tangirala et al. | 60/39.76 |
| 2005/0183413 A1 | 8/2005 | Kojima et al. | 60/247 |
| 2005/0210879 A1 | 9/2005 | Murayama et al. | 60/776 |
| 2005/0223711 A1 | 10/2005 | Goldmeer et al. | 60/772 |

* cited by examiner

MULTIPLE TUBE PULSE DETONATION ENGINE TURBINE APPARATUS AND SYSTEM

BACKGROUND OF THE INVENTION

The present disclosure relates generally to a pulse detonation engine (PDE) and, more particularly, to a multiple tube pulsed detonation chamber (PDC).

Known pulse detonation engines generally operate with a detonation process having a pressure rise, as compared to engines operating within a constant pressure deflagration. Although such engines vary in their implementation, a common feature is that air flow is directed into one or more pulse detonation chambers wherein the air is mixed with fuel and ignited to produce a combustion pressure wave. The combustion wave transitions into a detonation wave followed by combustion gases that produce thrust as they are exhausted from the engine. As such, pulse detonation engines may have the potential to operate at higher thermodynamic efficiencies than may generally be achieved with deflagration-based engines.

At least some known hybrid pulse detonation-turbine engines have replaced the steady flow constant pressure combustor within the engine with a pulse detonation combustor that includes a plurality of pulse detonation chambers. Although such engines vary in their implementation, a common feature amongst hybrid pulse detonation-turbine engines is that air flow from a compressor is directed into the pulse detonation chambers wherein the air is mixed with fuel and ignited to produce a detonation wave followed by combustion gases that are used to drive a turbine.

In the above known implementations of thrust-producing PDE's or hybrid pulse detonation-turbine engines, multiple tube PDCs have been introduced, which feature two or more parallel configured tubes. However, with this newer configuration, several mechanical assembly and alignment challenges for the multi-chamber PDE are also presented.

BRIEF DESCRIPTION OF THE INVENTION

The above discussed and other drawbacks and deficiencies of the prior art are overcome or alleviated by a pulse detonation combustor (PDC) assembly including an upstream chamber forming an inlet plenum, a downstream chamber including a downstream portion of at least one PDC tube, and an integrated PDC head coupled to the upstream chamber and the downstream chamber. The integrated PDC head is configured to facilitate fuel injection and ignition within the at least one PDC tube.

In another embodiment, a pulse detonation chamber (PDC) tube includes an inner seal surface and an outer seal surface configured to mate with the inner seal surface. The inner seal surface includes an elevated section thereon that engages with said outer seal surface such that the PDC tube is free to partially pivot about a longitudinal axis thereof.

In still another embodiment, a pulse detonation engine (PDE) includes a pulse detonation combustor (PDC) assembly in communication with an axial flow turbine assembly, the PDC assembly further including an upstream chamber forming an inlet plenum, a downstream chamber including a downstream portion of at least one PDC tube, and an integrated PDC head coupled to the upstream chamber and said downstream chamber. The integrated PDC head is configured to facilitate fuel injection and ignition within the at least one PDC tube.

BRIEF DESCRIPTION OF THE DRAWINGS

Referring to the exemplary drawings wherein like elements are numbered alike in the several Figures.

DETAILED DESCRIPTION OF THE INVENTION

Disclosed herein are pulse detonation engines and improved components of the same. As will be discussed in greater detail, the pulse detonation engine generally comprises a pulse detonation combustor located within a coaxial liner that allows the pulse detonation combustor to be cooled, (optionally) a transition piece located downstream of the pulse detonation combustor configured to direct flow from the combustor and coaxial liner to an axial turbine assembly located downstream, and (optionally) a axial turbine assembly. A source of a compressed oxidizer (e.g., a compressor) is located upstream of the pulse detonation combustor.

In the descriptions that follow, the term "axial" refers broadly to a direction parallel to the axis about which the rotating components of a gas turbine engine rotate. An "upstream" direction refers to the direction from which the local flow is coming, while a "downstream" direction refers to the direction in which the local flow is traveling. In the most general sense, flow through the engine tends to be from front to back, so the "upstream direction" will generally refer to a forward direction, while a "downstream direction" will refer to a rearward direction.

As used herein, a "pulse detonation combustor" (PDC) is understood to mean any device or system that produces both a pressure rise and velocity increase from a series of repeating detonations or quasi-detonations within the device. A "quasi-detonation" is a supersonic turbulent combustion process that produces a pressure rise and velocity increase higher than the pressure rise and velocity increase produced by a deflagration wave. Embodiments of PDCs include a means of igniting a fuel/oxidizer mixture, for example a fuel/air mixture, and a detonation chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, auto ignition or by another detonation (cross-fire).

The geometry of the detonation chamber is such that the pressure rise of the detonation wave expels combustion products out the PDC exhaust to produce a thrust force or produce power by directing the airflow through a power extraction device. Pulse detonation can be accomplished in a number of types of detonation chambers, including detonation tubes, shock tubes, resonating detonation cavities and annular detonation chambers. As used herein, the term "tube" includes pipes having circular or non-circular cross-sections. Exemplary tubes include cylindrical tubes, as well as tubes having polygonal cross-sections, for example hexagonal tubes.

Figure 1:
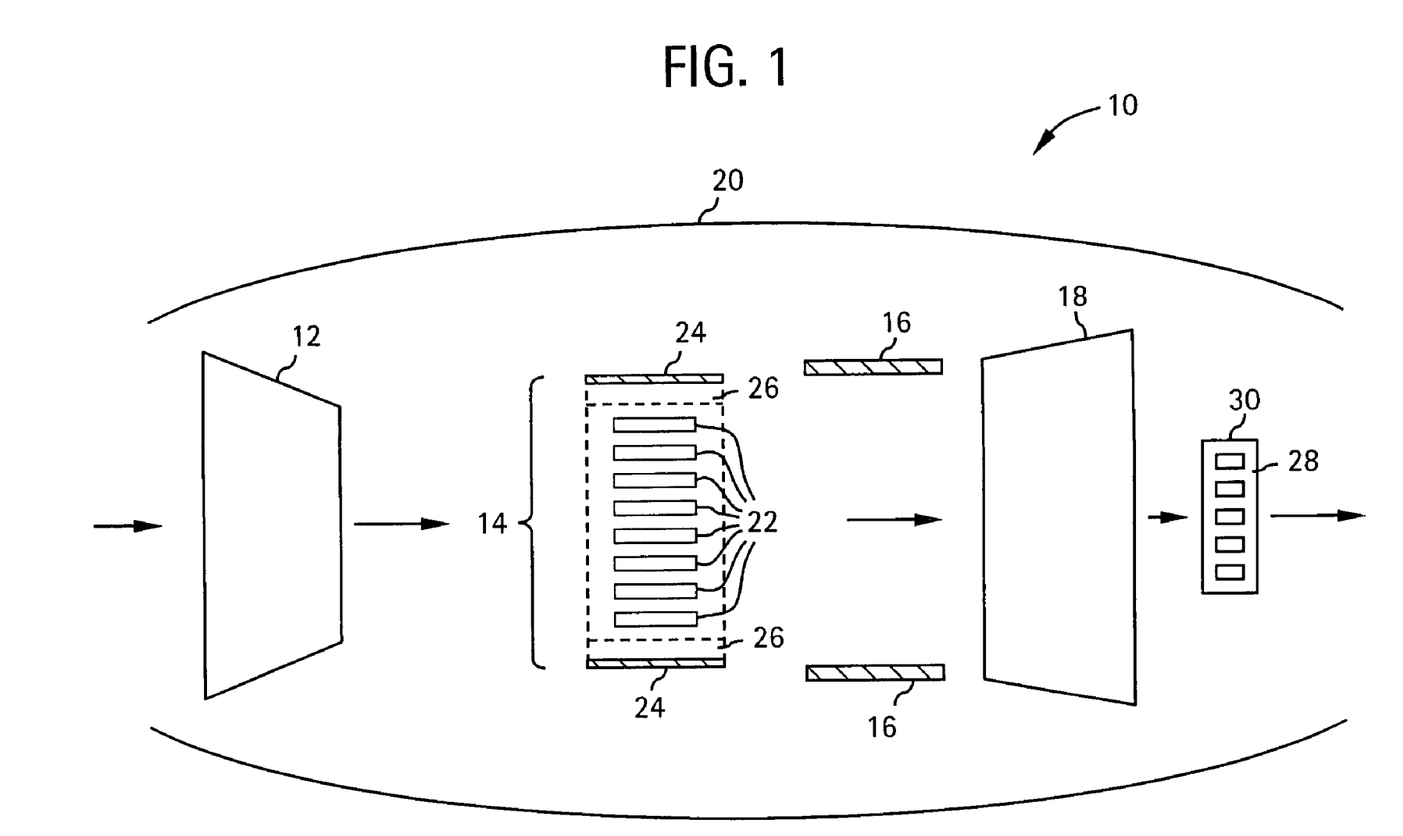
FIG. 1 is a schematic diagram of an exemplary pulse detonation engine (PDE) system, suitable for use in accordance with an embodiment of the invention.

FIG. 1 is a schematic diagram of an exemplary pulse detonation engine (PDE) system 10, suitable for use in accordance with an embodiment of the invention. The PDE system 10 includes a compressor 12, a PDC 14, a transition piece 16, and an axial turbine assembly 18. In one embodiment, the compressor 12 is located upstream of, and in fluid communication with, the PDC 14, which is in turn located upstream of, and in fluid communication with, the axial turbine assembly 18 via the transition piece 16. Stated another way, the compressor 12 is in serial axial fluid communication with the PDC 12 and the axial turbine assembly 18. In one embodiment, the compressor 12, PDC 14, transition piece 16 and the axial turbine assembly 18 are located within a housing 20, which can be particularly beneficial for use in mobile crafts (e.g., aircrafts and tanks). Alternatively, the compressor 12 can optionally be located outside of the housing 12 (e.g., in on-site and supplemental power generators).

The compressor 12 compresses primary air (e.g., an oxygen-containing gas such as air), and supplies the compressed primary air to the pulse detonation chamber(s) 22 of the PDC 14. Although FIG. 1 illustrates eight pulse detonation chambers 22, the number and arrangement of pulse detonation chambers may vary depending on the application. The PDC 14 includes at least one pulse detonation chamber 22 adapted to receive the primary airflow and a fuel flow. As used herein, the term "primary air" refers to the air (or other suitable oxidizer) supplied to each pulse detonation chamber 22 for primary therein. In one embodiment, the primary air may be oxygen, while in other embodiments the primary air may be ambient air or any other oxidizer.

In operation, the primary air and the fuel are introduced into the pulse detonation chambers 22 and are detonated either by external ignition, such as spark discharge or laser pulse for example, or by gas dynamic processes, such as shock focusing, auto ignition or by another detonation (crossfire). A few examples of fuel types include, but are not limited to, hydrogen, distillate fuels and natural gas. Exemplary distillate fuels include, but are not limited to, diesel fuel #2, Jet A fuel, kerosene and JP8. In one embodiment, the charge(s) of primary air and fuel are detonated in parallel (i.e., each charge is detonated at substantially the same time). In various other embodiments, the charges are detonated at different times.

The PDC 14 advantageously comprises a coaxial liner 24 defining a cooling plenum 26 (gap) between an outer wall of the PDC 14 and an inner wall of the coaxial liner. Secondary air travels along cooling plenum 26 acting to cool the PDC 14 and to cool downstream components including, but not limited to, the axial turbine assembly 18. As used herein, "secondary air" refers to air that is not supplied to the pulse detonation chambers 22. In one embodiment, the source of primary air and secondary air may be the same (e.g., air from the compressor 12). In other embodiments, the source of primary air and secondary air may be different from one another.

The cooling plenum 26 and each pulse detonation chamber 22 are in fluid communication with the axial turbine assembly 18 via a transition piece 16. The transition piece 16 is configured to modify the velocity profile of the high-pressure gas exiting the pulse detonation chamber(s) 22 and is configured to allow mixing of the secondary air from the cooling plenum 26 with the high-pressure gas from the pulse detonation chamber. The exact shape of the transition piece 16 varies depending on the desired application.

In various embodiments, the transition piece 16 may include a turbulent flow mixer(s) located on an outer surface of the transition piece (i.e., a surface in fluid communication with secondary air from the cooling plenum 26 and gases from the PDC 14). Such turbulent flow mixers may include any geometry that is capable of creating eddies, swirls and the like. Suitable geometries include, for example, hemispherical, pyramid-like shapes, square or rectangular protrusions, and the like.

The axial turbine assembly 18 comprises at least one turbine stage. In one embodiment, the turbine stage comprises a stator and a rotor. In various other embodiments, the turbine assembly 18 does not employ a stator. Instead, the flow can be directed by appropriately angling outlets of the pulse detonation chambers 22. Additionally or alternatively, the flow may be directed by counter-rotating turbines or a centrifugal turbine. The axial turbine assembly 18 can be used to provide thrust via the expulsion of the exhaust gases, to provide mechanical power by rotating a shaft connected to one of the turbines, or to provide a combination of thrust and mechanical power. In one embodiment, a shaft or shafts driven by one or more of the turbine stages power the compressor 12. Further, this energy can be used to power a vehicle (such as an airplane, a helicopter, a tank, or the like), a power-generation facility or assembly, the gas turbine engine itself, and the like.

In various other embodiments, an optional second PDC 28 is located downstream of the axial turbine assembly 18. Pulse detonation combustor 28 may include a similar or different configuration as PDC 14. For example, the PDC 28 includes at least one pulse detonation chamber 30 receiving air (e.g., an oxygen-containing gas such as air) from the axial turbine assembly 18 and fuel therein. In operation, the air and the fuel are introduced into the pulse detonation chambers 30 and are detonated by any suitable manner. Various exemplary detonation techniques are discussed above in relation to PDC 14.

Further, it is to be understood that the pulse detonation engine 10 can be modified, as understood by those skilled in the art, to include various other components that are typically employed in gas turbine engines. While components vary depending on the application, exemplary additional components include, but are not limited to, fuel injection systems, turbofan(s), ram ducts, valves, control systems (e.g., a computer), and the like. Moreover, the PDE engine 10 can be adapted to be employed in both turbofan and turboshaft engines.

Figure 2:
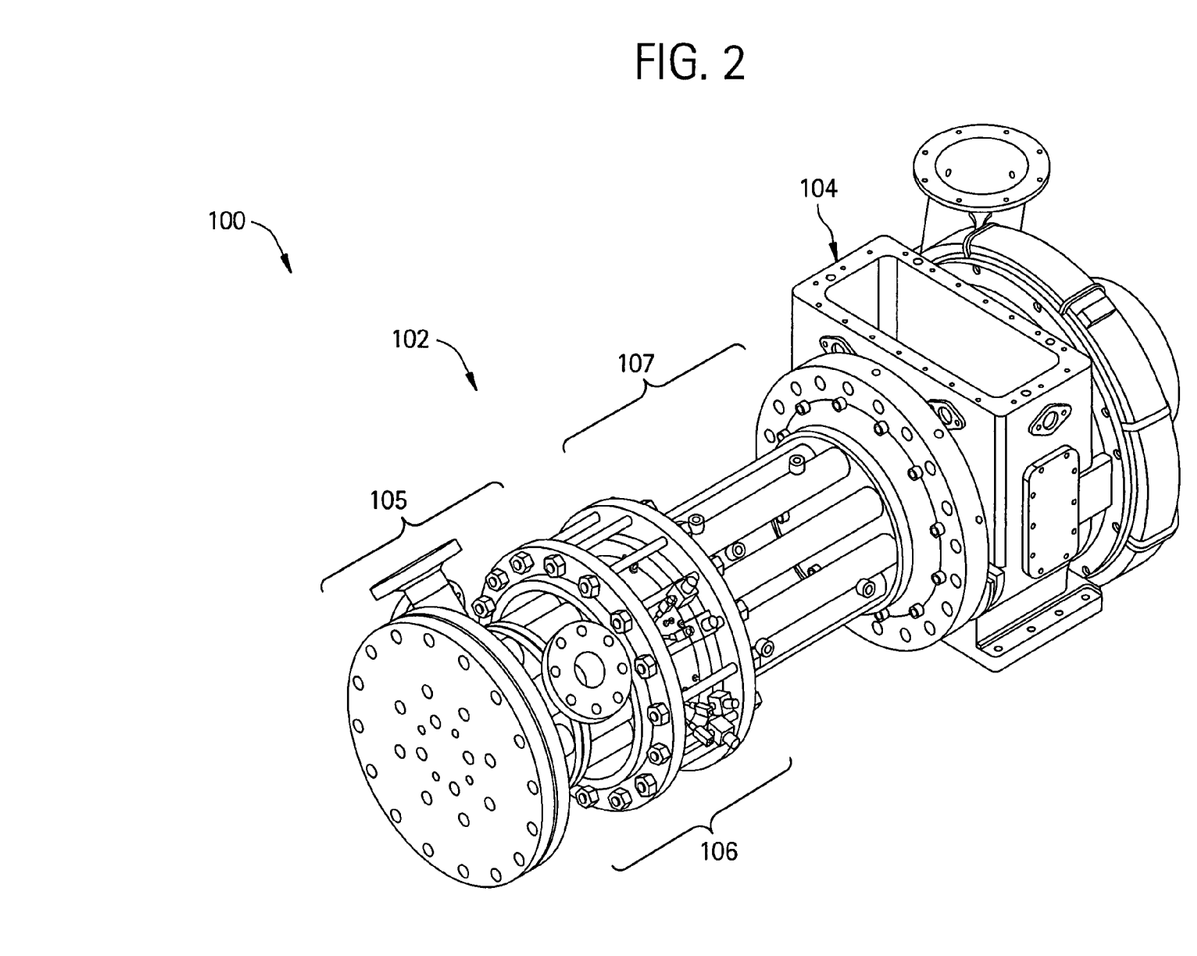
FIG. 2 is a perspective view of a pulse detonation chamber (PDC) assembly having an integrated PDC head (IPH), in accordance with an embodiment of the invention.
Figure 3:
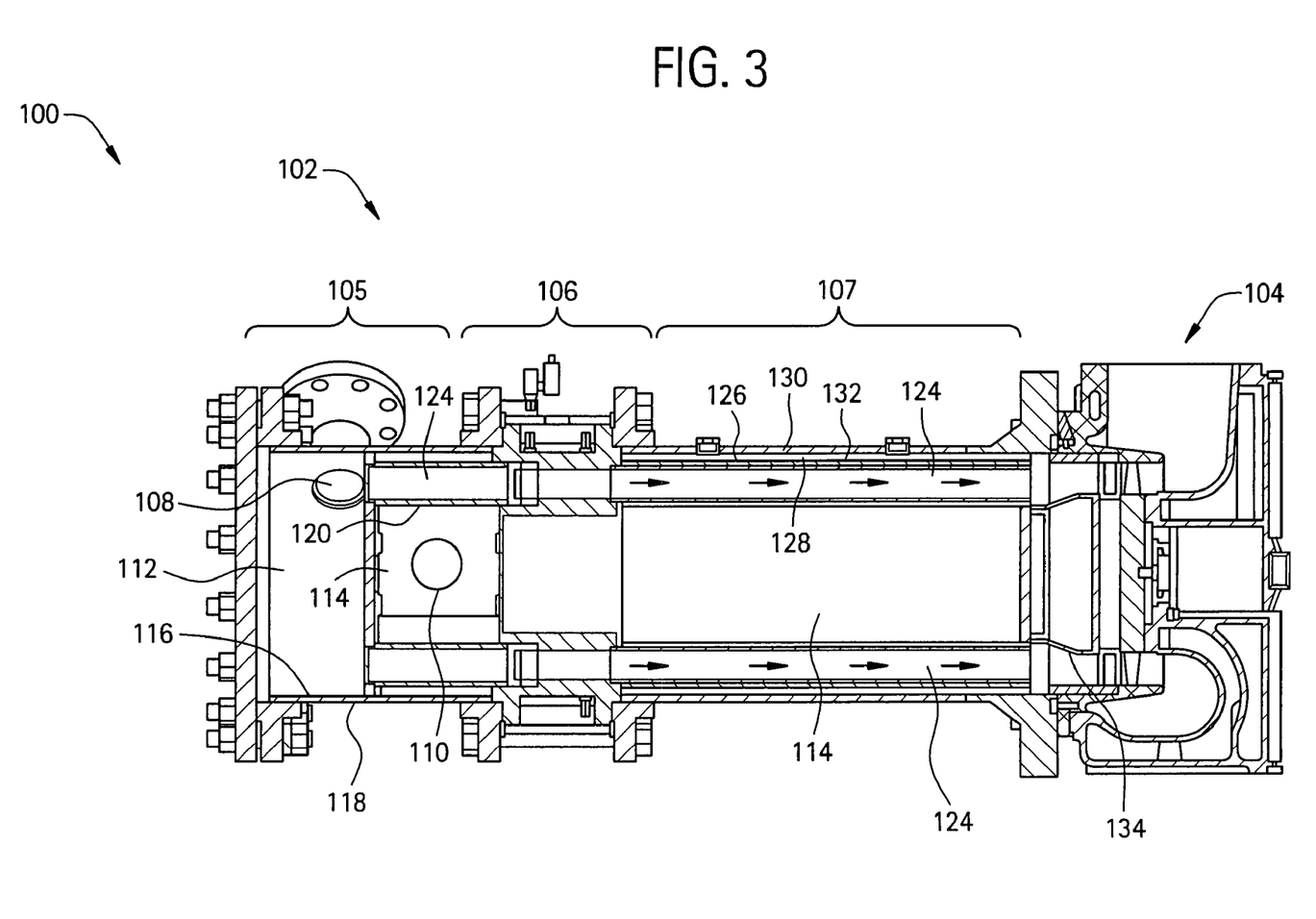
FIG. 3 is a cross sectional view of the pulse detonation engine assembly of FIG. 2.

FIGS. 2-3 are perspective and cross sectional views, respectively, of an exemplary configuration of a PDE 100, including a multiple tube, PDC assembly 102 and an axial flow turbine assembly 104. As will be described more fully herein, the PDC assembly 102 generally features an upstream chamber 105, an integrated PDC head (IPH) 106, and a downstream chamber 107. The IPH 106 incorporates all of the complexities of the fuel injection, spark ignition and cooling fluid inlet/outlets for internal obstacles into a single, monolith component.

As particularly illustrated in FIG. 3, the upstream chamber 105 of the PDC assembly 102 includes a primary air inlet 108 and a secondary air inlet 110. The primary air inlet 108 is configured to allow primary air (e.g., an oxygen-containing gas such as air) from a primary air source to be directed to a primary air plenum 112. Similarly, the secondary air inlet 110 is configured to allow secondary air from a secondary air source to be directed to the upstream portion of a secondary air plenum 114. The primary air plenum 112 is substantially isolated from the secondary air plenum 114, in that 5 percent (by volume) or less of the primary air flow actually passes into the secondary air plenum 114 (and, more specifically, less than 1 percent by volume). In one embodiment, however, the primary air plenum 112 may be hermetically sealed from the secondary air plenum 114.

As indicated above, the source of primary air and secondary air may either be the same source or different sources. Exemplary sources of primary and secondary air may include any oxygen containing gas, such as gases from a compressor(s) (not shown), and the like. Thus, the primary air may be oxygen or ambient air, for example.

As further illustrated in FIG. 3, the primary air plenum 112 is defined by an inner wall 116 of a housing 118 of the upstream chamber 105 and an outer wall 120 of an inner housing that defines the upstream portion of the secondary air plenum 114. Although the primary air plenum 112 and the secondary air plenum 114 are depicted as having a substantially circular cross section, the plenums 112 and 114 may also comprise non-circular cross sections as well.

The primary air plenum 112 is configured to allow the primary air to flow into the downstream chamber 107, which includes the downstream portion of a plurality of individual pulse detonation tubes 124, two of which are shown in the cross sectional view of FIG. 3. In particular, the primary air is directed to each of the individual pulse detonation tubes 124, as illustrated by the arrows. Again, exemplary pulse detonation tubes 124 may include, but are not limited to: detonation tubes, shock tubes, resonating detonation cavities and annular detonation chambers. The total number of pulse detonation tubes 124 varies depending on the application and, in an exemplary embodiment, an 8-tube PDC is illustrated herein.

In operation, the primary air and fuel are introduced into each pulse detonation tube 124 (specifically, within IPH 106) and are detonated either by external ignition, such as spark discharge or laser pulse, or by gas dynamic processes, such as shock focusing, auto ignition or by another detonation (crossfire). Exemplary fuels are discussed above. In one embodiment, the charge(s) of primary air and fuel are detonated in parallel, (i.e., each charge is detonated at substantially the same time). In various other embodiments, the charges are detonated at different times.

Concurrently, secondary air from the secondary air plenum 114 is directed to a cooling plenum 126 defined by an inner wall 128 of a coaxial liner 130 and an outer wall 132 of the downstream chamber 107. The secondary air travels along cooling plenum 126 acting to cool the downstream chamber 107 and to cool various downstream components including, but not limited to, the axial turbine 104. In the depicted embodiment, the cooling plenum 126 and each pulse detonation tube 124 are in fluid communication with the axial turbine 104 through a transition piece 134.

The transition piece 134 is configured to modify the velocity profile of the high-pressure gas exiting the pulse detonation tube(s) 124 to allow mixing of the secondary air from the cooling plenum 126 with the high-pressure gas from the pulse detonation tube 124. The exact shape of the transition piece will vary depending on the desired application. An exemplary transition piece 134 is characterized by a truncated funnel shape. Additional details concerning transition piece 134 may be found in co-pending Ser. No. 11/262,652, filed Oct. 31, 2005, and assigned to the assignee of the present application.

Figure 4:
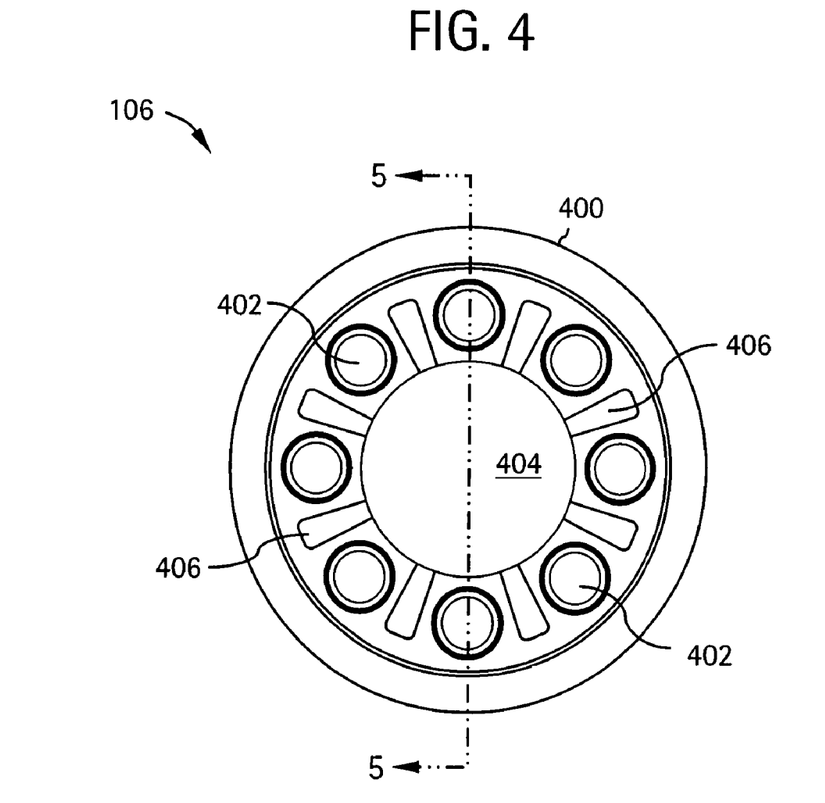
FIG. 4 is an end view of the IPH shown in FIG. 3.
Figure 5:
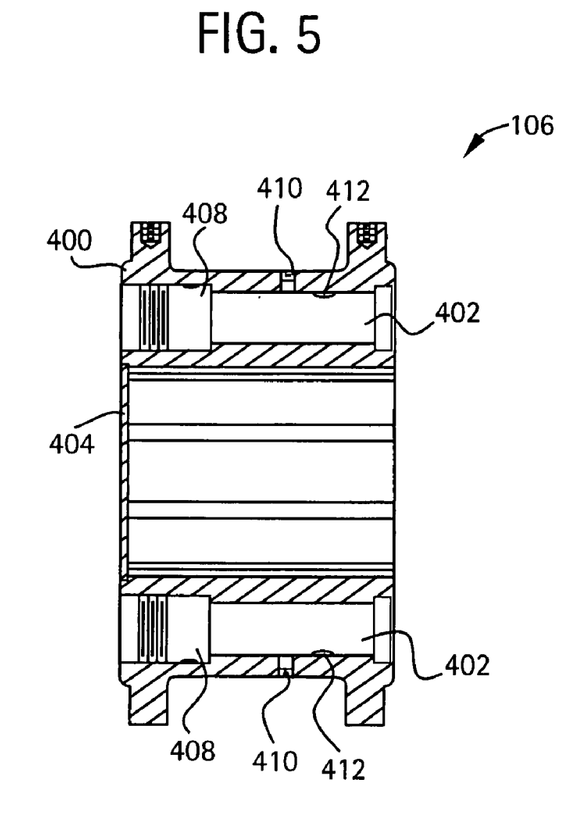
FIG. 5 is a sectional view of the IPH, taken along the lines 5-5 in FIG. 4.

Referring now to FIGS. 4 and 5, the IPH 106 is illustrated in further detail. As is shown, the IPH 106 combines all the complexities of the fuel injection, spark ignition and a cooling fluid inlet/outlet for internal obstacles into a single monolith component 400. In the side view of FIG. 4, a plurality of annular (circumferentially) disposed tube openings 402 accommodates the insertion of the upstream and downstream portions of the pulse detonation tubes 124 therein. In this sense, the tube openings 402 are an integral part of the tubes 124. A washer or other suitable plate 404 is disposed at the upstream side of the IPH 106 so as to direct secondary air through ports 406 formed between the individual PDC openings 402.

As shown in the sectional view of FIG. 5, each PDC opening 402 is provided with a fuel/air mixer 408, an igniter 410 for igniting the fuel/air mixture and an anchor 412 for securing an obstacle (e.g., spiral) for creating eddies used in the DDT. The anchor can also provide a point for a water inlet/outlet that may be used to cool the DDT obstacles. The exemplary IPH configuration 106 thus provides a reduced number of parts and a simpler manufacture/assembly process, and can be applied to either a single tube design or a multiple tube design such as the one depicted in the figures.

One specific challenge associated with assembling a multi-tube PDC is the alignment of the individual tubes with respect to the seals at each end thereof. For example, during assembly, the tubes of the PDC sealed at a first end can be misaligned by as much as 10 degrees at the opposite end, leading to difficulty in aligning an inserting the free ends into the corresponding seal. Furthermore, during operation of the PDC, the tubes are subject to thermal expansion, thus tightening the seal surface at the ends thereof.

Figure 6:
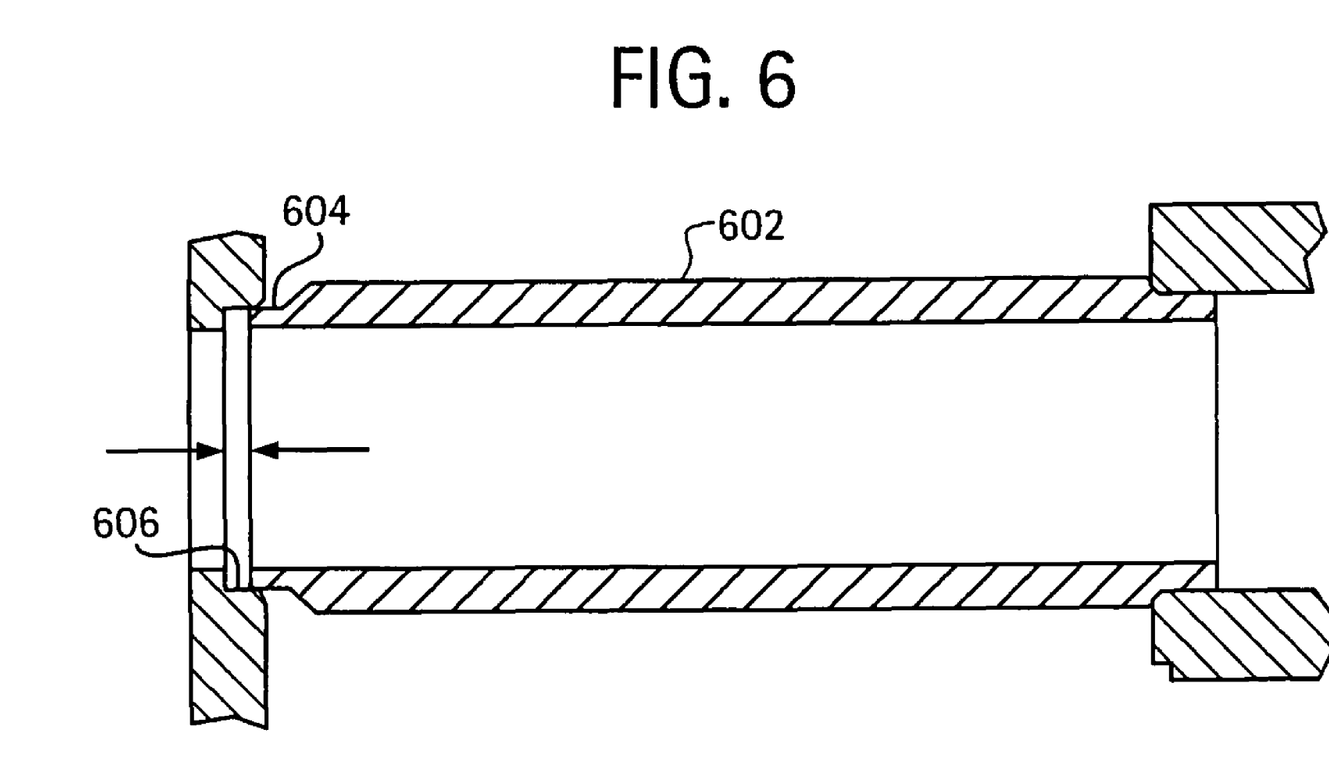
FIG. 6 is a cross sectional view illustrating the alignment of the PDC tubes within the PDE, in accordance with a further embodiment of the invention.

Accordingly, FIG. 6 is a cross sectional view illustrating the alignment of the tubes within the PDC, in accordance with a further embodiment of the invention. In particular, the PDC tube section 602 (upstream or downstream) has an inner seal surface 604 that is brought into mating engagement with an outer seal surface 606 of a corresponding PDC component (such as the IPH 106, for example). In order to compensate for a certain range of misalignment at the opposing end of the tube section 602, the actual width of the contact portion of the inner seal surface 604 with respect to the outer seal surface 606 is relatively small so as to provide a measure of flexibility to adjust and align the opposite end of the tube section 602. Accordingly, the resulting seal between the inner and outer seal surfaces is somewhat functionally similar to a ball joint.

As is also illustrated in FIG. 6, a lateral gap adjacent the end of the inner seal surface 604 (indicated by arrows) is initially present when the inner seal surface 604 is mated to the outer seal surface 606. This allows for a linear thermal expansion of the PDC tube section 602 during the operation thereof (as well as a diameter expansion), which will provide a more secure fit at both ends of the tube section 602.

Figure 7:
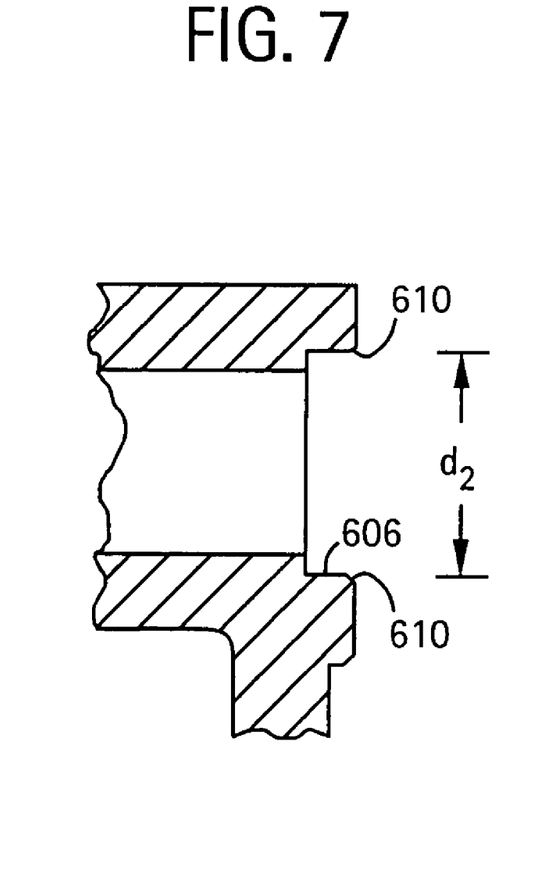
FIG. 7 is an enlarged view of the outer seal surface shown in FIG. 6.
Figure 8:
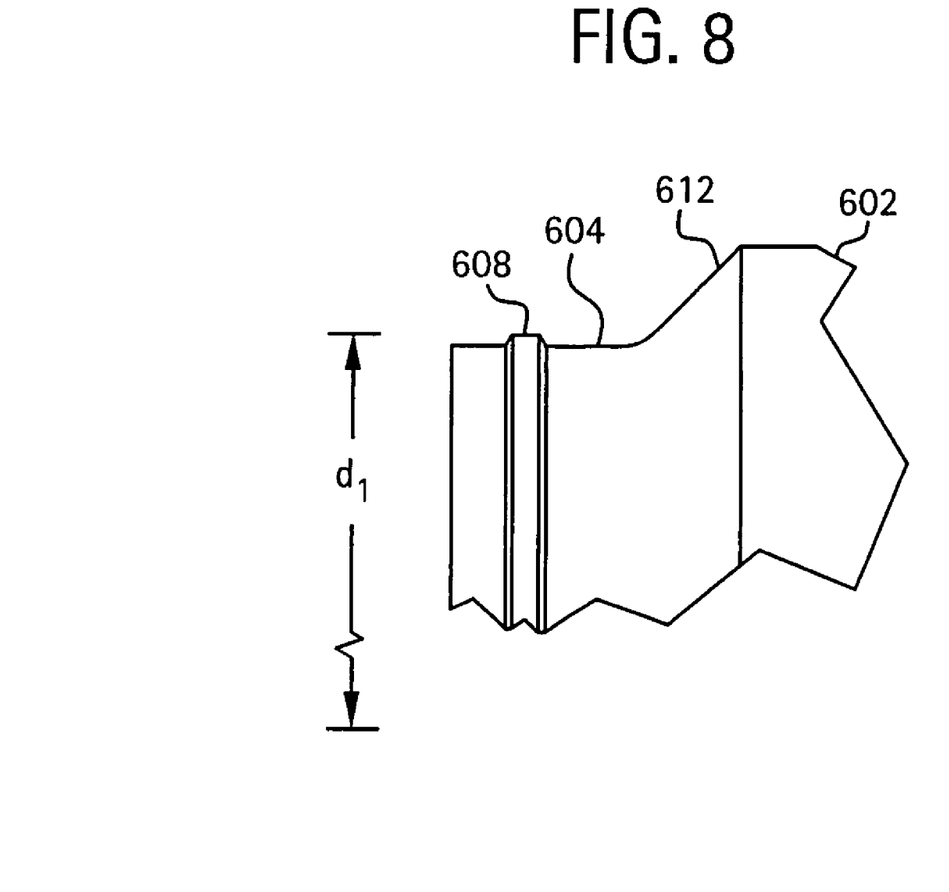
FIG. 8 is an enlarged view of the inner seal surface shown in FIG. 6.

The relationship between the inner seal surface 604 and outer seal surface is more specifically illustrated in FIGS. 7 and 8, although it should be noted that FIGS. 7 and 8 are not depicted to scale with respect to one another. As can be seen in FIG. 8, of the entire length of the inner seal surface 604 of the tube section 602, only a small portion thereof is configured to contact the outer seal surface 606 of FIG. 7, due to the presence of an elevated section 608 that slightly increases the thickness (and hence diameter) of the inner seal surface 604 at that location. Thus, the outside diameter of the inner seal surface 604 at the elevated section 608 (represented by $d_1$ in FIG. 8) is dimensioned to be slightly less than the inside diameter of the outer seal surface 606 (represented by $d_2$ in FIG. 7). An exemplary tolerance for $d_1$ with respect to $d_2$ may be about $0 < d_2 - d_1 \leq 0.005$ inches. In order to guide the elevated section 608 into engagement with the outer seal surface 606, the outer edges of the outer seal surface 606 may be beveled, as shown at 610 in FIG. 7.

The width of the elevated section 608 (i.e., that portion of the length of the inner seal surface that mates with the outer seal surface) is selected so as to provide both a sufficient seal and yet also provide a desired degree of flexibility (e.g., 10 degrees) to facilitate the alignment of tubes without the need for complex clamps, soft gasket materials or other sealing devices. The tube, when inserted, can thus partially pivot about the longitudinal axis thereof. In an exemplary embodiment, the width of the elevated section 608 may be a function of the outside diameter of the tube section 602. Finally, it will be noted that although the illustrated embodiments depict a taper (612 in FIG. 8) of the outside diameter of the tube section 602 down to the outside diameter of the inner seal surface 604, this need not be the case. In other words, with the exception of the elevated section 608, the entire length of the tube section 602 may have the same outside diameter as the outside diameter of the inner seal surface 604.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A pulse detonation combustor (PDC) assembly, comprising:
    an upstream chamber including a primary air inlet and a secondary air inlet, the primary air inlet configured to allow primary air to be directed to a primary air plenum, the secondary air inlet configured to allow secondary air to be directed to a secondary air plenum;
    a downstream chamber including a downstream portion of at least one PDC tube, the downstream chamber in flow communication with the primary air plenum to allow primary air to flow into the at least one PDC tube, the downstream chamber further including a cooling plenum in flow communication with the secondary air plenum to allow secondary air to cool the downstream chamber; and
    an integrated PDC head coupled to said upstream chamber and said downstream chamber, said integrated PDC head configured to facilitate fuel injection and ignition within said at least one PDC tube.

2. The PDC assembly of claim 1, wherein said integrated PDC head further comprises at least one tube opening formed therethrough, an upstream portion and said downstream portion of said at least one PDC tube inserted in opposing ends thereof.

3. The PDC assembly of claim 2, wherein said integrated PDC head further comprises:
    a fuel/air mixer in communication with said at least one tube opening; and
    an igniter in communication with said at least one tube opening, said igniter configured to ignite a fuel/air mixture introduced into said at least one tube opening.

4. The PDC assembly of claim 3, wherein said integrated PDC head further comprises an anchor configured for securing an obstacle used in a deflagration-to-detonation transition (DDT).

5. The PDC assembly of claim 1, wherein said integrated PDC head further comprises secondary air through ports disposed between individual tube openings.

6. A pulse detonation combustor (PDC) tube, comprising:
    an inner seal surface; and
    an outer seal surface configured to mate with said inner seal surface wherein the PDC tube is used within a pulse detonation combustor; and
    wherein said inner seal surface includes an elevated section thereon that increases an outside diameter of said inner seal surface, the outside diameter of said inner seal surface being slightly less than an inside diameter of said outer seal surface such that the PDC tube is free to partially pivot about a longitudinal axis thereof.

7. The PDC tube of claim 6, wherein the inside diameter of said outer seal surface exceeds the outside diameter of said elevated section by about 0.005 inches or less.

8. The PDC tube of claim 6, wherein a lateral gap adjacent the end of said inner seal surface is defined upon mating said inner surface to said outer seal surface so as to allow for a linear thermal expansion of the PDC tube.

9. A pulse detonation engine (PDE), comprising:
    a pulse detonation combustor (PDC) assembly in communication with an axial flow turbine assembly, said PDC assembly further comprising:
        an upstream chamber including a primary air inlet and a secondary air inlet, the primary air inlet configured to allow primary air to be directed to a primary air plenum, the secondary air inlet configured to allow secondary air to be directed to a secondary air plenum;
        a downstream chamber including a downstream portion of at least one PDC tube, the downstream chamber in flow communication with the primary air plenum to allow primary air to flow into the at least one PDC tube, the downstream chamber further including a cooling plenum in flow communication with the secondary air plenum to allow secondary air to cool the downstream chamber; and
        an integrated PDC head coupled to said upstream chamber and said downstream chamber, said integrated PDC head configured to facilitate fuel injection and ignition within said at least one PDC tube.

10. The PDE of claim 9, wherein said integrated PDC head further comprises at least one tube opening formed therethrough, an upstream portion and said downstream portion of said at least one PDC tube inserted in opposing ends thereof.

11. The PDE of claim 10, wherein said integrated PDC head further comprises:
    a fuel/air mixer in communication with said at least one tube opening; and
    an igniter in communication with said at least one tube opening, said igniter configured to ignite a fuel/air mixture introduced into said at least one tube opening.

12. The PDE of claim 11, wherein said integrated PDC head further comprises an anchor configured for securing an obstacle used in a deflagration-to-detonation transition (DDT).

13. The PDE of claim 9, wherein said integrated PDC head further comprises secondary air through ports disposed between individual tube openings.

14. The PDE of claim 9, wherein at least one of said upstream portion and said downstream portion of said at least one PDC tube further comprises an inner seal surface configured to mate with a corresponding outer seal surface, wherein said inner seal surface includes an elevated section thereon that engages with said outer seal surface such that said at least one PDC tube is free to partially pivot about a longitudinal axis thereof.

15. The PDE of claim 14, wherein a width of said elevated section of said inner seal surface of said PDC tube corresponds to an outside diameter of said PDC tube.

16. The PDE of claim 14, wherein an inside diameter of said outer seal surface exceeds an outside diameter of said elevated section by about 0.005 inches or less.

17. The PDE of claim 14, wherein a lateral gap adjacent the end of said inner seal surface is defined upon mating said inner surface to said outer seal surface so as to allow for a linear thermal expansion of said PDC tube section.

* * * * *